Dec. 24, 1968   C. SHORROCK   3,417,961
THROTTLE VALVES

Filed Jan. 5, 1966   2 Sheets-Sheet 1

Inventor
CHRISTOPHER SHORROCK
By Young & Thompson
Attorneys

Dec. 24, 1968   C. SHORROCK   3,417,961
THROTTLE VALVES

Filed Jan. 5, 1966   2 Sheets-Sheet 2

Inventor
CHRISTOPHER SHORROCK
By Young & Thompson
Attorneys

United States Patent Office 3,417,961
Patented Dec. 24, 1968

3,417,961
THROTTLE VALVES
Christopher Shorrock, Preston, England, assignor to
Rubery Owen & Co. Ltd.
Filed Jan. 5, 1966, Ser. No. 518,931
5 Claims. (Cl. 251—212)

ABSTRACT OF THE DISCLOSURE

A throttle valve comprising two plates, the plates being pivotally attached to opposed walls of a rectangular section conduit, and means for pivoting said two plates in synchronism with one another to move them from a first or open position in which each plate lies along the respective wall of the conduit to which it is pivotally attached, to a second position in which the downstream tips of the plates are close together, and in which the facing faces of the plates are curved to assist in directing any flow of fluid through the conduit between the two plates with a minimum of turbulence.

This invention relates to an improved throttle valve, particularly but not exclusively for use with a carburettor for an internal combustion engine.

By the term "throttle valve" used herein is meant a device intended to permit controlled and variable restriction of the through-orifice of a conduit, within which the valve is mounted, to permit control of the quantitative flow of fluid through the conduit.

A known type of throttle valve which is sometimes called a butterfly valve comprises a disc or plate which is complementary to and a close fit within the orifice of the conduit. This disc or plate is pivoted centrally about an axis at right angles to the through axis of the orifice to be movable through an angle of 90° between limit positions in which it closes and opens the orifice.

One disadvantage of this type of known throttle valve is that it disturbs the flow lines of the fluid flowing through the conduit by, for example, directing the fluid against the conduit wall and thus setting up a degree of turbulence in the fluid downstream of the throttle valve. In, for example, the application of throttle valves to carburettors for internal combustion engines, this turbulence will mean a consequential loss in efficiency of the engine.

An object of the present invention is to obviate or mitigate the above disadvantage.

According to the present invention there is provided a throttle valve comprising two plates, the plates being pivotally attached to opposed walls of a rectangular section conduit, and means for pivoting said two plates in synchronism with one another to move them from a first or open position in which each plate lies along the respective wall of the conduit to which it is pivotally attached, to a second position in which the downstream tips of the plates are close together.

Preferably the facing faces of the plates are curved to assist in directing any flow of fluid through the conduit between the two plates with the minimum turbulence.

Preferably also each plate is pivotally attached at its upstream end to the respective wall of the conduit.

Preferably, further, the plates are pivotally attached within recesses in the inside walls and the outside faces of the plates are flat to enable them to lie against the respective inside walls of the conduit.

An embodiment of the present invention will now be described by way of example with reference to the accompanying drawings of which:

Figure 1:
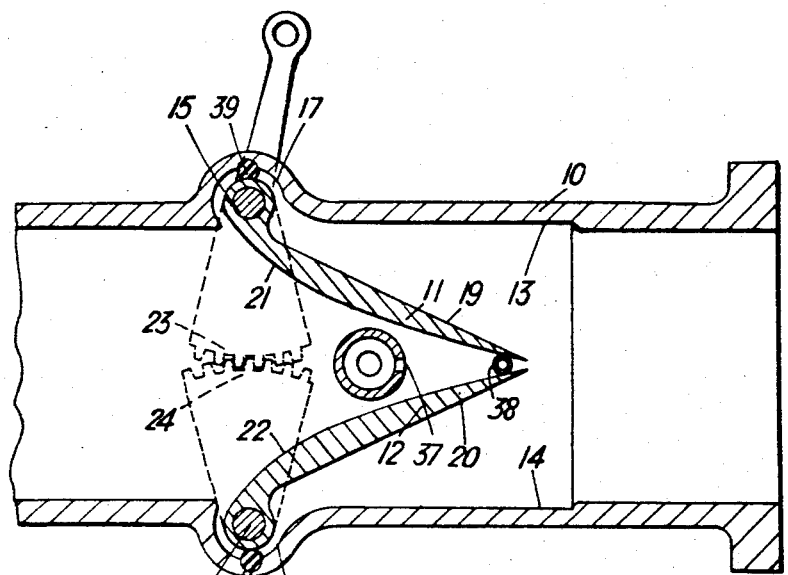
FIG. 1 shows a throttle valve with the plates in the closed position.

The throttle valve shown in FIG. 1, is mounted in the fuel-air mixture supply conduit 10 from a carburettor (not shown) to the induction manifold of an internal combustion engine (not shown).

It is quite normal to have a throttle valve in this position the valve controlling the quantity of fuel-air mixture passing into the engine and the valve setting varying in accordance with engine speed or load through the control of the engine throttle control.

The part of the supply conduit 10 in which the moving parts of the throttle valve are mounted is rectangular, for example square, in cross-section. The moving parts comprise two specially shaped plates 11, 12 which are mounted on opposed walls inside the conduit 10, one plate 11 on the top inside wall 13 and the other plate 12 on the bottom inside wall 14. This pivotal mounting is achieved by mounting the upstream ends of the plates 11, 12 on pivot pins 15, 16 located in recesses 17, 18 in the top and bottom inside walls 13 and 14 respectively, so that in one extreme position of pivotal movement the plates 11, 12 may lie along the top and bottom inside walls 13, 14 of the conduit 10, the appropriate face 19, 20 of each plate being flat to enable it to lie against the respective inside wall 13, 14 of the conduit.

Strips 39, 40 of a resilient material are interposed between the pivotted ends of the plates 11, 12 and the recess 17, 18 to act as seals.

The inside or facing faces 21, 22 of the two plates are curved to assist in directing any flow of fuel-air mixture through the conduit 10 between the two plates 11, 12 with the minimum turbulence imparted to this mixture which will be emitted past the plates in a steady passing centrally through the conduit.

The two plates 11, 12 have to pivot towards or away from one another in synchronism so that the downstream tips of the two plates, which each describe an arc when the plates are pivoted between their extreme positions, will always be at the same distance from a horizontal plane bisecting the conduit.

This synchronised movement of the two plates can be achieved through various drive arrangements, for example, the two pivot pins 15, 16 mounting the plates 11, 12 can be geared to a common rack, and the rack and the pivot pins can be so geared together that movement of the rack in one direction will impart the desired movement, through the pivot pins, to the plates. As an alternative example, shown in FIG. 1 the two pivot pins 15, 16 are connected to the centres of equi-sized separate meshing gear segments 23, 24. Movement imparted to one segment 23 in one rotational direction will cause equal but opposite rotational movement of the other segment 24.

Figure 2:
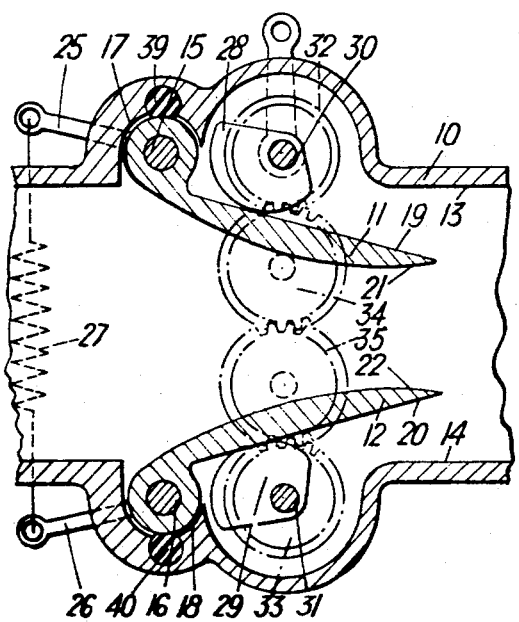
FIGS. 2, 3 and 4 show modifications of the throttle valve of FIG. 1, in these figures the plates being in a partially open position; and In the drawings similar parts will be given the same reference numerals.
Figure 3:
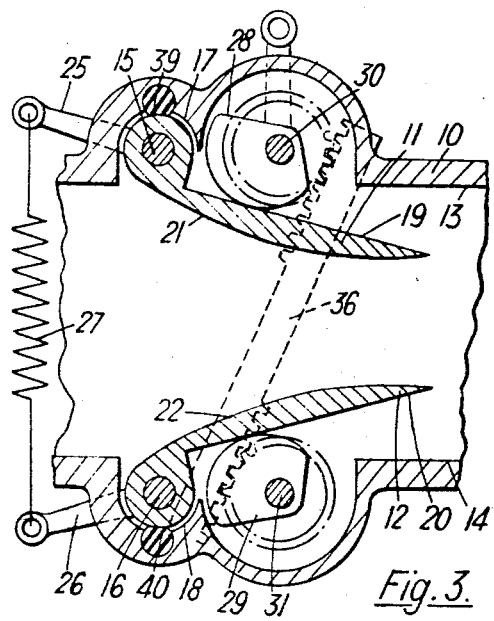

In a further alternative arrangement shown in FIG. 2 and 3, the two pivot pins 15, 16 have lever arms 25, 26 interconnected by a tension spring 27 which tends to maintain the plates 11, 12 in their open position lying against the walls 13, 14 of the conduit. Identical simple harmonic cams 28, 29 are provided, one for each plate, mounted on pivot axes 30, 31 separate from the plates 11, 12 and just downstream of the pivot pins 15, 16 the cammed surfaces of the cams abut the flat faces 19, 20 of the plates so that rotation of the cams in the appropriate direction will pivot the plates towards one another against the action of the tension spring 27. The pivot axes of the cams have pinions 32, 33 interconnected by gears 34, 35 as shown in FIG. 2, or a rack 36, as shown in FIG. 3, whereby rotation imparted to one cam 28 in one direction will cause equal but opposite rotational movement of the other cam 29 to close both plates equally. Thereafter, the return action of the tension spring 27 will cause contra rotation of the cams to open the plates again.

The drive arrangement for pivotting the two plates 11, 12 or the cams 28, 29 as appropriate, is, of course, actuated by and under the control of the throttle pedal in the case of a motor vehicle.

Figure 4:
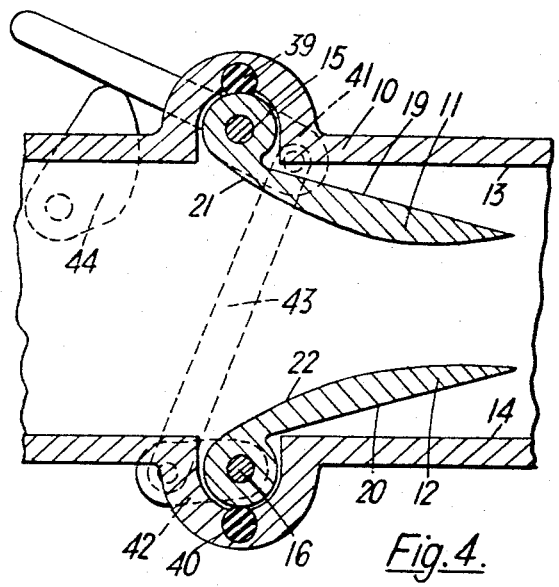

In yet a further modification shown in FIG. 4, the plates 11, 12 are pivotted about their axes by arms 41 and 42 attached to pivot pins 15 and 16 respectively.

A connecting link 43 is pivotally attached to the arms 41, 42 such that rotational movement imparted to arm 41 by a simple harmonic cam 44 will impart equal opposite rotational movement to arm 42.

The carburettor in which the throttle is provided may have two fuel jets, a main jet 37 (FIG. 1) and a compensating jet 38 (FIG. 1) debouching into the conduit 10 through a side wall thereof, the two jets being spaced apart but centred upon the aforesaid horizontal plane bisecting the conduit, the compensating jet being downstream of the main jet but just upstream of the tips of the two plates when the two plates are pivotted close together.

In a modification a different number of jets may be used and their relevant positions may be varied, that is their positions may be varied relative to one another or relative to the aforesaid horizontal plane.

The plates may be made of any suitable material and will normally be of a suitable metal.

I claim:
1. An internal combustion engine fuel system, including a throttle valve comprising a rectangular section conduit, each of two opposed walls of the conduit having a recess therein, a plate pivotally mounted at its upstream end in each recess, the facing faces of the two plates being convexly curved to direct any fluid flow therebetween through the conduit with a minimum of turbulence and the outside face of each plate being flat to enable it to lie against its respective wall of the conduit, and control means operable to pivot said two plates in synchronism with one another to move them from a first or open position in which each plate lies along the respective wall of the conduit to which it is pivotally attached, to a second position in which the downstream tips of the plates are close together.

2. A throttle valve as claimed in claim 1 in which the control means operable to pivot the two plates comprises two identical simple harmonic cams, one abutting each plate, mounted on pivot axes in opposed walls of the conduit downstream of the pivotted ends of the plates, the cams being connected by a gear train such that rotational movement of one cam will impart opposite rotational movement to the other cam, a spring being provided to urge each plate against its respective cam.

3. A throttle valve as claimed in claim 1 in which the control means operable to pivot the two plates comprises two identical simple harmonic cams, one abutting each plate, mounted on pivot axes in opposed walls of the conduit downstream of the pivotted ends of the plates, a pinion being attached to each cam co-axial with the axis of rotation of the cam, said pinions meshing with a rack such that movement of the rack will impart equal opposite rotational movement to the cams, a spring being provided to urge each plate against its respective cam.

4. A throttle valve as claimed in claim 1 in which the control means operable to pivot the two plates comprises two arms, one connected to the pivot of each plate, a connecting link being provided between the arms such that rotational movement imparted to one arm by a simple harmonic cam will impart equal opposite rotational movement to the other arm.

5. A throttle valve as claimed in claim 1 in which the control means operable to pivot the two plates comprises a gear segment attached to each plate, co-axial with the pivot axis of said plates, said gear segments meshing with each other such that movement imparted to one segment in one rotational direction will cause equal but opposite rotational movement of the other segment.

References Cited

UNITED STATES PATENTS

| | | | |
|---|---|---|---|
| 1,504,508 | 8/1924 | Richardson | 251—250 X |
| 1,543,637 | 6/1925 | Woll | 251—212 X |
| 2,228,733 | 1/1941 | Reichhelm et al. | 251—305 X |
| 2,354,155 | 7/1944 | Sternberg | 98—41 |
| 2,375,432 | 5/1945 | Miller et al. | 251—212 X |
| 2,393,170 | 1/1946 | Kinney et al. | 251—212 X |
| 2,721,678 | 10/1955 | Gill | 251—212 X |
| 2,740,635 | 4/1956 | O'Toole | 251—212 X |
| 3,046,602 | 7/1962 | Houvener | 251—298 X |
| 3,160,385 | 12/1964 | Di Cesare | 251—212 X |
| 3,312,159 | 4/1967 | Shepherd | 251—212 X |

FOREIGN PATENTS 1,726    1915    Great Britain.

M. CARY NELSON, *Primary Examiner.*

R. C. MILLER, *Assistant Examiner.*